(12) United States Patent
Dotaro et al.

(10) Patent No.: US 7,536,104 B2
(45) Date of Patent: May 19, 2009

(54) TREE OPTICAL TRANSMISSION NETWORK

(75) Inventors: Emmanuel Dotaro, Bures-sur-Yvette (FR); Nicolas Le Sauze, Bures-sur-Yvette (FR)

(73) Assignee: Alcatel, Paris (FR)

( * ) Notice: Subject to any disclaimer, the term of this patent is extended or adjusted under 35 U.S.C. 154(b) by 615 days.

(21) Appl. No.: 11/109,782

(22) Filed: Apr. 20, 2005

(65) Prior Publication Data
US 2005/0237974 A1    Oct. 27, 2005

(30) Foreign Application Priority Data
Apr. 21, 2004   (FR)   ................... 04 50742

(51) Int. Cl.
*H04J 14/00*   (2006.01)
(52) U.S. Cl. ........................................ 398/58
(58) Field of Classification Search ............ 398/41, 398/66, 58, 63
See application file for complete search history.

(56) References Cited

U.S. PATENT DOCUMENTS

| | | |
|---|---|---|
| 5,343,314 A | 8/1994 | Nakamura |
| 2002/0061163 A1 * | 5/2002 | Bartur et al. ............. 385/24 |
| 2003/0016692 A1 | 1/2003 | Whittlesey |
| 2003/0063843 A1 | 4/2003 | Horne |
| 2005/0078958 A1 * | 4/2005 | Chae et al. ............. 398/41 |

OTHER PUBLICATIONS

Patent Abstracts of Japan, vol. 0154, No. 65, Nov. 26, 1991 corresponding to JP 3 201838 A (NEC Corp.) dated Sep. 31, 1991.

* cited by examiner

*Primary Examiner*—Quan-Zhen Wang
(74) *Attorney, Agent, or Firm*—Sughrue Mion, PLLC

(57) ABSTRACT

The network comprises an optical interconnection tree linking sending points of stations to a receiving point of a concentrator via access links (F1-F3), a coupling system (C) and a common optical link (OL). The stations can send optical signals ($\lambda u1$, $\lambda u2$, $\lambda u3$) each carried by the same "uplink" wavelength ($\lambda u$). Each station includes a carrier detection system able to detect the presence at its sending point (Ki) of an optical wave at said uplink wavelength ($\lambda u$) that was not sent by the same station. The detection system cooperates with sending control means to inactivate sending if such presence is detected. The network further includes: an emulator (LDa, Ca, G1-G3) adapted to send auxiliary waves ($\lambda a1$, $\lambda a2$, $\lambda a3$) at said uplink wavelength ($\lambda u$) and to couple them into the access links (F1-F3) so that they propagate in the downlink propagation direction; and a control system ($2a$) of the emulator for selectively activating the sending of the auxiliary waves. The invention is particularly applicable to optical access or metropolitan networks.

11 Claims, 2 Drawing Sheets

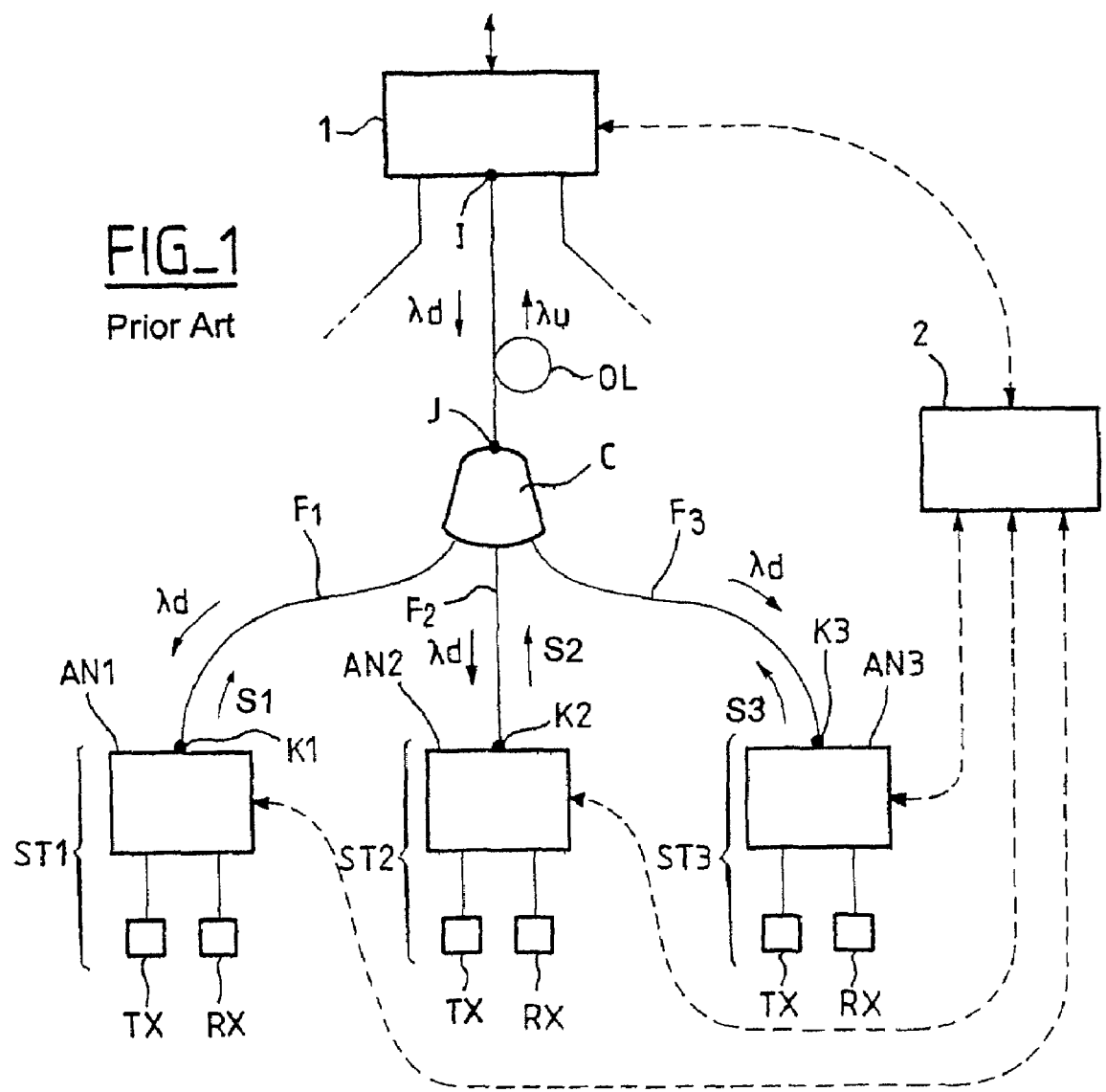
FIG_1
Prior Art
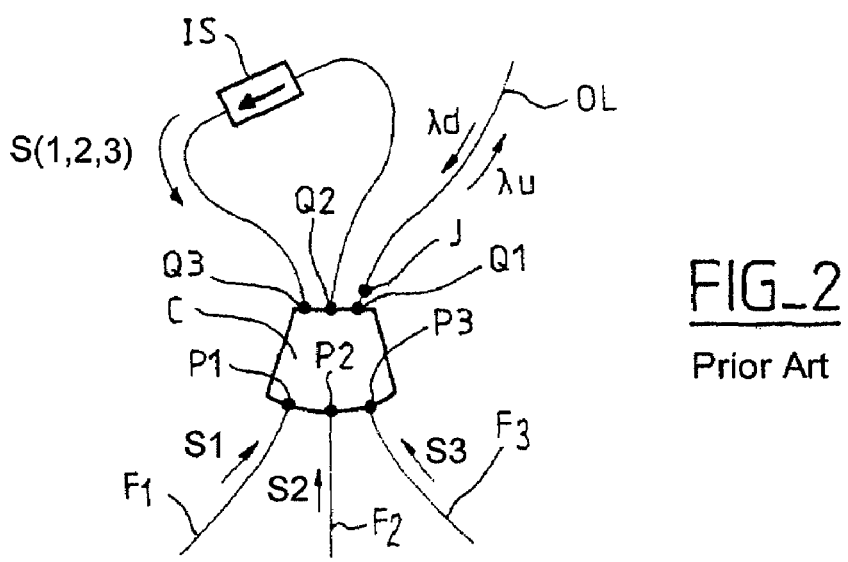
FIG_2
Prior Art

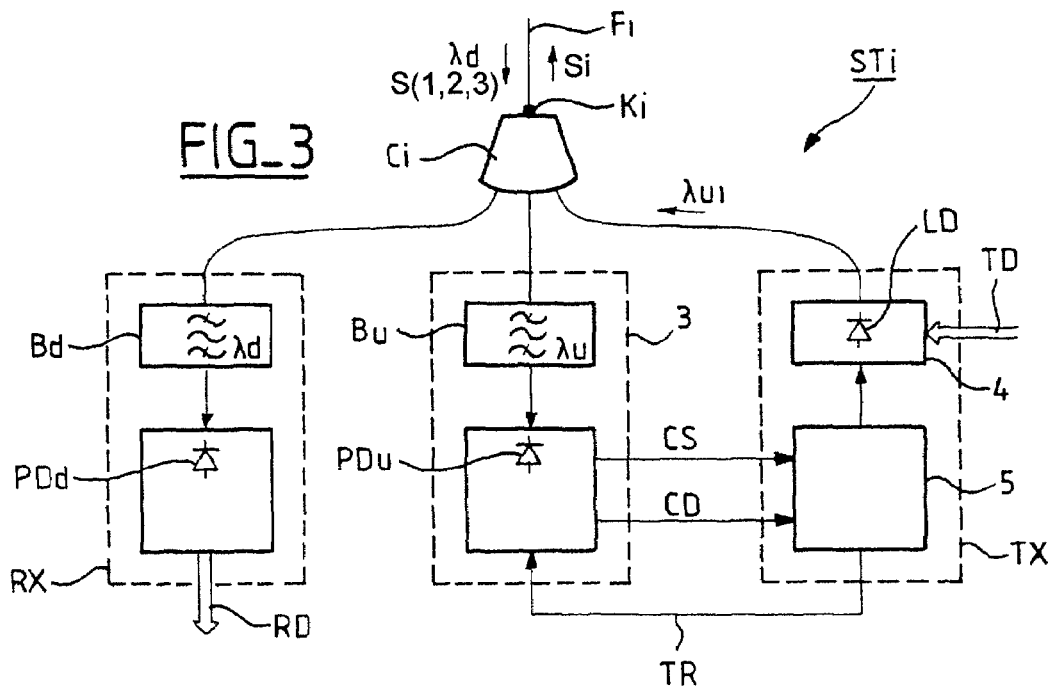
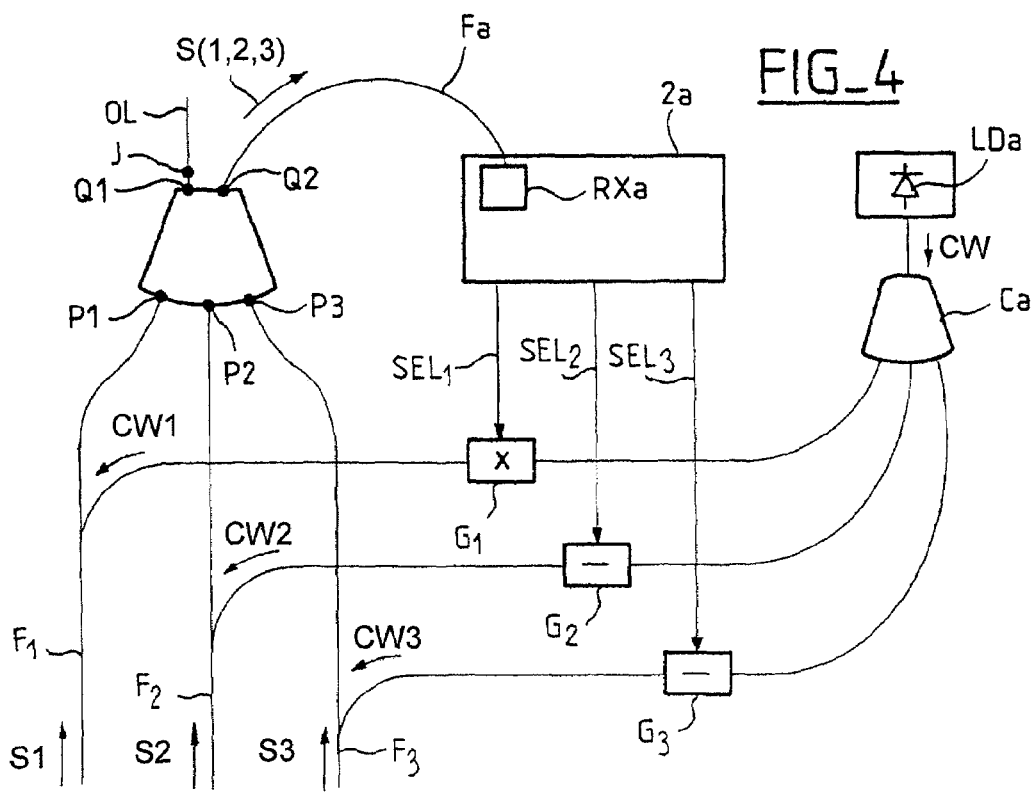

TREE OPTICAL TRANSMISSION NETWORK

BACKGROUND

The field of the invention is that of optical link transmission networks. The invention relates more particularly to optical networks suitable for relatively small geographical areas, such as access or metropolitan networks.

An optical network generally comprises a plurality of stations able to send and receive optical signals to and from other stations of the network. These exchanges of information are effected by means of optical links to which access nodes that serve the respective stations are connected.

The wavelength division multiplexing (WDM) technique is advantageously used to exploit the bandwidth capacity of the optical links.

Moreover, if the network is sufficiently small, systems for regenerating individual channels need not be provided. A network of this kind is referred to as a "transparent" network, but can nevertheless include optical amplifiers for amplifying all the channels of the transmitted WDM multiplexes simultaneously. If the network additionally comprises no line amplifiers, it is referred to as a "passive" network.

The invention applies to a network of any of the types referred to above if the network has a tree configuration. To simplify the disclosure, FIG. 1 shows diagrammatically the simplest embodiment of a network of the above kind, i.e. a passive transparent network using a single wavelength in each signal propagation direction.

In this example, the network comprises three stations ST1-ST3 each of which is adapted to send to a concentrator 1, sometimes referred to as a hub or optical line terminal (OLT), via an optical interconnection tree that connects respective sending points K1-K3 of the stations to the same receiving point I of the concentrator. The tree is made up of optical link comprising dedicated access links F1-F3 connecting the sending points K1-K3 of the stations to respective inputs of a coupler C and a common optical link OL having a first end coupled to the receiving point I and a second end J connected to an output of the coupler C.

In their most economical embodiment, the access links F1-F3 and the common optical link OL are simply fibers, but links provided with amplifiers may be more appropriate for longer distances.

The property of the links of being able to propagate signals in two opposite propagation directions (the "uplink" direction from the stations to the concentrator and the "downlink" direction from the concentrator to the stations) may be exploited to exchange signals between the concentrator and the stations. In this case, the sending points K1-K3 and the receiving point I also constitute receiving points and a sending point, respectively. A network of the above type is described below, although the invention may also be applied to networks in which uplink and downlink traffic are carried by separate links.

To communicate with the stations, the concentrator includes an optical sender and an optical receiver (not shown), each of which is coupled to the common optical link OL at the point I. The concentrator generally also enables the access network to communicate with other access networks and/or with an external interconnection network (not shown).

Similarly, each station ST1-ST3 includes an optical sender TX and an optical receiver RX coupled to the associated fiber F1-F3 via a corresponding access node AN1-AN3, an external port of which constitutes one of the sending (and receiving) points K1-K3.

In the simplest case, the concentrator and the stations each comprise one sender and one receiver. The sender of each station then uses a carrier wave having a first or "uplink" wavelength $\lambda u$ common to all the stations, this wave propagating in the direction of the concentrator, which therefore includes a receiver able to detect the uplink wavelength $\lambda u$. Similarly, the sender of the concentrator uses a carrier wave having a second or "downlink" wavelength $\lambda d$, this wave propagating in the direction of the stations. Each station therefore includes a receiver adapted to detect the downlink wavelength $\lambda d$.

In practice, the signals exchanged in a network of the above kind consist of packets, for example Ethernet frames or ATM cells. This applies in particular to an Ethernet passive optical network (EPON) and an ATM passive optical network (APON).

As shown in FIG. 1, by virtue of the coupler C, the respective uplink signals S1, S2, S3 sent by the stations ST1, ST2, ST3 converge at the end J of the common optical link OL. Accordingly, with the uplink wavelength $\lambda u$ being common to the stations, it is necessary to take into account the risk of collisions between the uplink signals, i.e. the fact that a plurality of signals from a plurality of stations may reach the end J simultaneously.

A first solution to this problem is for the stations to use the time division multiple access (TDMA) technique to send signals. Thus the stations are allocated respective separate successive time windows and each station can send only during its own time windows, which thus define a TDM time channel.

This method presupposes that the sending phases of the respective stations are well synchronized. This necessitates accurate synchronization means common to all the stations of the network. Because the stations are far apart, implementation by the usual electrical means is relatively difficult and costly.

Moreover, if the simpler solution of providing predefined time windows is adopted, changes in the respective bandwidth requirements of the stations are totally ignored. This generally results in sub-optimum use of the resources of the network.

It is nevertheless possible to envisage modifying the addresses of the windows assigned to the respective stations dynamically, the modifications taking into account changes in the instantaneous requirements of the respective stations. This implies centralized management of the network which, according to the conventional approach, requires a network controller and electrical means for exchange of information between each station and the controller. This is shown in FIG. 1 by the presence of the controller 2 and control links symbolized by dashed-line arrows.

This solution is even more costly than the preceding solution, since it requires each station to be provided with suitable control means such as dedicated dialogue and processing circuits.

Another option for dealing with the problem of collisions is to use the carrier sense multiple access/collision detection (CSMA/CD) mechanism which is well known in the field of electrical bus networks common to a plurality of stations. Suffice to say that it provides in each station collision detection means, i.e. means for detecting situations in which, during the sending of a packet by the station, a concurrent signal is sent by another station. If a station detects a collision, sending of the current packet is interrupted. Subsequently, when the detection means indicate that no signal is being sent by any other station, a new attempt to send the same packet may be effected, after a certain inhibition time to ensure that each station has been able to reset itself.

The above principle can be transposed directly to optical networks comprising an optical bus, i.e. an optical link along which a plurality of stations that can send on the same wavelength are coupled.

To implement this method in the context of the tree optical network described above, it is necessary to adapt the links to route to each station each signal sent by each of the other stations.

This can be achieved in the manner shown in FIG. 2. For a network having N stations, the coupler C is an N to 3 star coupler (N =3 in the present example) having N input ports P1, P2, P3 connected to the respective fibers F1, F2, F3 leading to the stations and three output ports Q1, Q2, Q3. The output port Q1 is coupled to the end J of the common optical link OL and the other two output ports Q2, Q3 are coupled to each other through an isolator IS. Thus the combination S(1, 2, 3) of uplink signals S1, S2, S3 is liable to be sent simultaneously by the stations is re-injected into the fibers F1, F2, F3 in the downlink direction.

Stations implementing the signal detection and collision mechanism are known in the art. How a station STi (here i=1, 2, 3) can be implemented is nevertheless described in outline next with reference to FIG. 3.

The network access node consists of a coupling system executing the 1 to 3 coupling function, here simply represented by a coupler Ci. A first port of the coupler is coupled to the associated fiber Fi (here i=1, 2, 3) and constitutes the sending point Ki of the station. One of the other three ports opposite the first is connected to the receiver RX, the second to a collision detection system 3 and the third to the sender TX.

The receiver RX is able to detect the downlink wavelength $\lambda d$, for example by means of a filter Bd that selects the wavelength $\lambda d$ followed by a photodetector PDd and electronic circuits (not shown in detail) that deliver the corresponding received data RD in electrical form.

The sender TX includes a sending system 4 for storing the data TD to be sent and converting it to optical form. The system 4 includes in particular a laser source tuned to the uplink wavelength $\lambda u$ and modulation means (not shown in detail). The sender TX further includes sending control means 5 adapted to command activation of the sending system 4 to send the uplink signals Si and to dialogue with the collision detection system 3.

The collision detection system 3 includes a receiver able to detect the uplink wavelength $\lambda u$, for example by means of a filter Bu that selects the wavelength $\lambda u$ followed by a photodetector PDu. Taking into account the optical power level received at the uplink wavelength $\lambda u$ and the activity status of the sender TX (as indicated by a signal TR supplied by the sending control means 5), the system 3 can detect collisions, i.e. the presence at the sending point Ki of an optical wave at the uplink wavelength that did not come from the sender of the same station. If a collision occurs, the system 3 notifies the sending control means 5 of the sender (signal CD). In this case, a new attempt is made subsequently to send the data affected by the collision.

The collision detection system 3 also determines if there is any signal at the uplink wavelength $\lambda u$ propagating in the fiber in the downlink direction, and notifies the sending control means 5 of the sender accordingly (signal CS); this tells the sender whether it is authorized to send or not. The combination of the detection system 3 and the sending control means 5 thus constitutes a standard CSMA/CD type collision management system.

Compared to the method described above using time division multiplexing, the CSMA/CD solution has the advantage of being totally decentralized. However, by virtue of factors inherent to its theory, this technique offers poor performance in terms of the global traffic capacity of the network. Furthermore, the respective bandwidth requirements of the stations cannot be taken into account and the use of network resources is sub-optimal.

BRIEF DESCRIPTION

An object of the invention is to propose another solution that is free of the drawbacks of the methods described above. To this end, it aims to employ simple, inexpensive and centralized management of authorizing stations to send.

With this aim in view, the invention provides an optical transmission network comprising a concentrator, a plurality of stations, and an optical interconnection tree linking respective sending points of the stations to the same receiving point of the concentrator, said interconnection tree including a common optical link having a first end coupled to said receiving point and a second end coupled to each of said sending points of the stations via a coupling system and access links associated with the respective stations, each access link being a point-to-point link connecting the coupling system to the sending point of a single station and enabling the propagation of optical waves from the station to the coupling system in an "uplink" propagation direction or in an opposite "downlink" propagation direction, said stations including senders adapted to send from their respective sending points optical signals each carried by the same "uplink" wavelength and propagating in said uplink propagation direction, each station including a carrier detection system able to detect the presence at the sending point of an optical wave at said uplink wavelength that did not come from the sender of the same station, and said detection system cooperating with sending control means to inactivate said sender if such presence is detected, said network being characterized in that it includes:
an emulator adapted to send auxiliary waves at said uplink wavelength and to couple them into said access links so that they propagate in said downlink propagation direction, and
a control system of said emulator for selectively activating the sending of said auxiliary waves.

The particular advantage of this disposition of the network is that it allows the use of a form of operation analogous to time division multiplexing but without necessitating the addition of long synchronization and/or control links to the stations. By virtue of an appropriate mode of operation of the control system, and by providing suitable optical receivers in the stations, the same emulator can optionally further serve to send the stations test signals or signaling for the purposes of network management.

In the main application of the invention to time division multiplexing, the sending periods of the respective stations may be assigned in a particularly simple way. They are generally selected to prevent collisions between uplink signals. To this end, the control system is adapted to activate the sending of auxiliary waves in the access links so that at most one signal sent by only one station can reach the second end of the common optical link at any time.

These time periods in fact depend on the operating context of the network and can be modified dynamically. A first option is for the control system to authorize the stations to send in turn for predetermined time periods.

Another option is for the control system to authorize the stations to send during respective time periods that are a function of their respective sending bit rate requirements.

In one embodiment of the invention, said emulator includes a source of an optical control wave at said uplink wavelength coupled to said access links by respective optical gates controlled by said control system.

Note that the invention does not require the development of dedicated systems in the stations. Indeed, in another embodiment of the invention it is advantageous if each station includes a standard CSMA/CD collision management system that can serve directly as a carrier detection system and sending control means because, the invention preventing collisions, dedicated means for detecting collisions are a priori of no utility. However, there being a large market for standard CSMA/CD stations, they are available at much lower cost than stations developed specifically for this purpose.

It is interesting to note that the invention may also be implemented in an installed network conforming to the CSMA/CD standard simply by inserting the emulator into the network, without having to modify the stations of the network.

Other aspects and advantages of the invention will become apparent in the further description given with reference to the drawings.

BRIEF DESCRIPTION OF THE DRAWINGS

FIG. 1, commented on above, represents one example of a metropolitan access network which may be used with the invention.

FIG. 2, commented on above, represents a detail of the implementation of a CSMA/CD type mechanism in the FIG. 1 network.

FIG. 3, commented on above, is a diagram showing a station that includes a standard CSMA/CD type collision detection system and can be used in the network of the invention.

FIG. 4 is a diagram of one embodiment of the invention.

DETAILED DESCRIPTION

In the light of the foregoing explanations, the practical implementation of the invention does not give rise to any particular difficulties. Apart from using stations STi including a carrier detection system, as shown in FIG. 3, the invention consists essentially in producing an emulator and its control system. These are shown in the FIG. 4 diagram.

The figure shows the access links F1-F3, the common optical link OL and the coupler C already described above.

The emulator includes a source LDa for supplying an optical control wave CW at an uplink wavelength λu. This source LDa is typically a continuous emission laser diode and is coupled (for example by a star coupler Ca) to the access links F1-F3 via respective optical gates G1-G3. The coupling is of course such that the auxiliary waves CW1, CW2, CW3 extracted from the control wave CW by the coupler Ca and the gates G1-G3 are able to propagate in the access links in the downlink direction.

The optical gates G1-G3 are controlled by the control system 2a which is adapted to apply to them respective and appropriate control voltages SEL1-SEL3 which therefore selectively control the sending of the auxiliary waves CW1, CW2, CW3 by the output ports of the gates and consequently their propagation in the respective access links F1, F2, F3.

The gate activation and deactivation time periods therefore condition the auxiliary wave sending periods and consequently the periods during which the stations are authorized to send.

The objective of the system being to prevent collisions between uplink signals, the activation and deactivation time periods referred to above must satisfy the condition that at most one signal sent by only one station can reach the second end J of the common optical link at any time.

Assuming that the respective optical propagation times from the stations ST1-ST3 to the coupler C are practically identical, and likewise the propagation times from the gates G1-G3 to the stations, the above condition amounts to having to activate all of the optical gates with the exception of the one gate that corresponds to the station authorized to send.

Strictly speaking, there are propagation time differences, but they are generally very small. To allow for them, one option is to provide, before deactivating a gate, an inhibition phase in which all the ports are activated, this phase having an appropriate and sufficient duration, for example a duration at least equal to the maximum difference between the propagation times that correspond to the different paths from the coupler Ca to the stations and from the stations to the coupler C.

Another option is to make the guard time between the disappearance of the auxiliary wave and the effective start of sending by the sender of each station at least equal to this maximum time difference.

If the duration of the inhibition phase or the guard time is to be minimized, the various paths defined above can still be equalized, for example by means of calibrated delay lines inserted into the links between the coupler Ca and the gates G1-G3. Propagation time differences can also be compensated by offsetting the respective activation and deactivation times of the gates accordingly.

There are various options in respect of the respective periods in which sending by the stations is authorized.

The control system 2a can be adapted to authorize the stations to send in turn during predetermined time periods.

Alternatively, the control system can authorize the stations to send during respective time periods as a function of their respective sending bit rate requirements. Those requirements can be established statistically and/or as a function of predefined privilege levels assigned to the various stations, for example by a class of quality of service system.

For optimum use of the bandwidth of the network, it is preferable to be able to adapt the respective sending authorization times of the stations dynamically as a function of their respective requirements evaluated in real time.

To this end, in one embodiment of the invention, an activity detector is provided to measure the optical power of waves at the uplink wavelength λu propagating in the uplink direction in the common optical link OL. The authorization of a station to send is interrupted if the measured power indicates absence of sending for a particular time period.

This reduces the probability of authorizing a station to send when it does not need to do so at that time.

The activity detector cooperates with the control system 2a and may simply consist of an optical receiver in the concentrator that is able to detect said uplink wavelength λu and is coupled to said receiving point I. In this embodiment, which is not shown in the figures, the only network component that has to be added is a connection between the concentrator and the control system 2a.

Given that, for the type of network concerned, there may be a relatively great distance between the concentrator and the control system (for example 20 km), whereas the control system 2a is normally in the vicinity of the coupling system C, connection problems are simplified if the activity detector is itself in the vicinity of the coupling system C. To this end, it is better to provide an activity detector including a dedicated optical control receiver RXa that is able to detect the uplink wavelength λu and is coupled to a point of the coupling system C at which all of the signals coming from the senders of the stations converge.

To be more precise, this embodiment is as shown in FIG. 4, for example. The coupling system (coupler C) includes a plurality of input ports P1-P3 connected to respective access links F1-F3 and first and second output ports Q1, Q2. The first output port Q1 is connected to the second end J of the common optical link OL and the second output port Q2 is coupled to the optical control receiver RXa. The control receiver is normally part of the control system 2a, as shown here.

The invention is not limited to the embodiments described above. In particular, it relates also to WDM networks, in which it suffices to provide the means described above for each of the wavelengths used.

Of course, the invention can be applied equally well to passive networks and to networks having links including amplifiers.

The invention claimed is:

1. An optical transmission network, comprising:
   a concentrator comprising a receiving point;
   a plurality of stations, each comprising a sending point;
   an optical interconnection tree linking respective sending points of the stations to the receiving point of the concentrator, said interconnection tree including:
      a common optical link having a first end coupled to said receiving point and a second end coupled to each of said sending points of the stations via a coupling system, and
      access links each being associated with a respective station and being a point-to-point link connecting the coupling system to the sending point of a respective station and enabling propagation of optical signals from the respective station to the coupling system in an uplink propagation direction or in an opposite downlink propagation direction, said optical signals each being characterized by an uplink wavelength when propagating in said uplink propagation direction; and
   an emulator adapted to send auxiliary optical waves at said uplink wavelength and to couple the auxiliary waves into said access links downstream of the coupling system to propagate in said downlink propagation direction; and
   a control system coupled to said emulator for selectively activating sending of said auxiliary waves to permit only one optical signal of the uplink wavelength to travel in the uplink direction to the coupling system.

2. The network according to claim 1, wherein said emulator includes:
   a source of an optical control wave at said uplink wavelength, and optical gates which couple said optical control wave source to said access links, wherein the optical gates are selectively controlled by said control system.

3. The network according to claim 1, wherein said control system is adapted to activate sending of the auxiliary waves in the access links so that at most one optical signal sent by a single station reaches said second end of the common optical link at any time.

4. The network according to claim 1, wherein the control system is adapted to authorize the stations to send the optical signals in turn during predetermined time periods.

5. The network according to claim 1, wherein the control system is adapted to provide an authorization to the stations to send the optical signals during respective time periods as a function of respective bit rate requirements of the stations.

6. The network according to claim 5, further comprising:
   an activity detector for measuring optical power of the optical signals at said uplink wavelength propagating in the common optical link in the uplink direction and wherein the authorization provided to the station to send is interrupted if the measured power indicates absence of the optical signals for a particular time period.

7. The network according to claim 6, wherein the activity detector comprises an optical receiver, embodied in the concentrator and coupled to the receiving point, to detect said uplink wavelength.

8. The network according to claim 6, wherein said activity detector includes:
   an optical control receiver to detect said uplink wavelength, which optical control receiver is coupled to a point of said coupling system at which the optical signals propagating in the uplink propagation direction from the stations converge.

9. The network according to claim 8, wherein said coupling system includes:
   a plurality of input ports connected to respective access links; and
   first and second output ports, wherein said first output port is connected to said second end of the common optical link and said second output port is coupled to said optical control receiver.

10. The network according to claim 1, wherein the station further comprises:
    a sending control means; and
    a carrier detection system coupled to the sending control means, which carrier detection system detects a presence of the optical signal at the uplink wavelength, propagating in the uplink propagation direction, at the sending point of the respective station, that did not come from the sending point of the respective station, and cooperates with the sending control means to inactivate the sending point.

11. The network according to claim 10, wherein the carrier detection system and the sending control means of each station are embodied in a CSMA/CD type collision management system.

* * * * *